(12) United States Patent
Hegna et al.

(10) Patent No.: US 9,684,086 B2
(45) Date of Patent: *Jun. 20, 2017

(54) METHOD FOR ACQUIRING AND PROCESSING MARINE SEISMIC DATA TO EXTRACT AND CONSTRUCTIVELY USE THE UP-GOING AND DOWN-GOING WAVE-FIELDS EMITTED BY THE SOURCE

(71) Applicant: PGS Geophysical AS, Oslo (NO)

(72) Inventors: Stian Hegna, Hovik (NO); Gregory Ernest Parkes, Corsham (GB)

(73) Assignee: PGS Geophysical, A.S., Oslo (NO)

( * ) Notice: Subject to any disclaimer, the term of this patent is extended or adjusted under 35 U.S.C. 154(b) by 0 days.

This patent is subject to a terminal disclaimer.

(21) Appl. No.: 14/794,554

(22) Filed: Jul. 8, 2015

(65) Prior Publication Data

US 2016/0047930 A1 Feb. 18, 2016

Related U.S. Application Data

(62) Division of application No. 13/686,408, filed on Nov. 27, 2012, now Pat. No. 9,110,180, which is a division of application No. 12/455,470, filed on Jun. 2, 2009, now Pat. No. 8,345,510.

(51) Int. Cl.
| | | |
|---|---|---|
| *G01V 3/12* | (2006.01) | |
| *G01S 3/80* | (2006.01) | |
| *G01S 1/72* | (2006.01) | |
| *G01V 1/36* | (2006.01) | |
| *G01V 1/38* | (2006.01) | |
| *G01V 1/00* | (2006.01) | |

(52) U.S. Cl.
CPC ............... *G01V 1/36* (2013.01); *G01V 1/006* (2013.01); *G01V 1/3808* (2013.01); *G01V 2210/56* (2013.01)

(58) Field of Classification Search
CPC ........................................................ G01V 3/12
USPC ........................................................ 324/334
See application file for complete search history.

(56) References Cited

U.S. PATENT DOCUMENTS

| | | | |
|---|---|---|---|
| 8,345,510 B2 * | 1/2013 | Hegna et al. ............... 367/124 |
| 9,110,180 B2 * | 8/2015 | Hegna et al. | |
| 2006/0050611 A1 * | 3/2006 | Borresen ...................... 367/24 |
| 2010/0211320 A1 * | 8/2010 | Vassallo et al. .............. 702/14 |
| 2011/0058450 A1 * | 3/2011 | van den Berg et al. ...... 367/24 |
| 2014/0321239 A1 * | 10/2014 | Robertsson et al. ........... 367/21 |

* cited by examiner

*Primary Examiner* — Bot Ledynh
(74) *Attorney, Agent, or Firm* — Richard A. Fagin

(57) ABSTRACT

A method for marine seismic surveying includes separating up-going and down-going wavefields from seismic energy emitted by at least one marine seismic energy source. The separated up-going and down-going wavefields are propagated from the at least one marine seismic energy source to at least one of a water surface and a common reference depth. One of the up-going and down-going wavefields is phase shifted 180 degrees. The propagated, phase shifted up-going and down-going wavefields are summed.

13 Claims, 4 Drawing Sheets

METHOD FOR ACQUIRING AND PROCESSING MARINE SEISMIC DATA TO EXTRACT AND CONSTRUCTIVELY USE THE UP-GOING AND DOWN-GOING WAVE-FIELDS EMITTED BY THE SOURCE

CROSS REFERENCE TO RELATED APPLICATIONS

Continuation of U.S. patent application Ser. No. 13/686,408 filed on Nov. 27, 2012, now U.S. Pat. No. 9,110,180 which is a divisional of U.S. patent application Ser. No. 12/455,470 filed on Jun. 2, 2009, now U.S. Pat. No. 8,345,510.

STATEMENT REGARDING FEDERALLY SPONSORED RESEARCH OF DEVELOPMENT

Not Applicable.

NAMES TO THE PARTIES TO A JOINT RESEARCH AGREEMENT

Not Applicable.

BACKGROUND

The disclosure relates generally to the fields of marine seismic data acquisition and data processing. More particularly the disclosure relates to methods for designing and actuating marine seismic sources, and for processing such data, in which the up-going and down-going wave-field emitted by the source can be extracted and added constructively.

In seismic exploration, seismic data are acquired by imparting acoustic energy into the Earth near its surface, and detecting acoustic energy that is reflected from boundaries between different layers of subsurface rock formations. Acoustic energy is reflected when there is a difference in acoustic impedance between adjacent layers to a boundary. Signals representing the detected acoustic energy are interpreted to infer structures and composition of the subsurface rock formation structures.

In marine seismic exploration, a seismic energy source, such as an air gun, or air gun array, is typically used to impart the acoustic energy into the formations below the bottom of the water. The air gun or array is actuated at a selected depth in the water, typically while the air gun or array is towed by a vessel. The same or a different vessel tows one or more seismic sensor cables, called "streamers", in the water. Generally the streamer extends behind the vessel along the direction in which the streamer is towed. Typically, a streamer includes a plurality of hydrophones disposed on the cable at spaced apart, known positions along the cable. Hydrophones, as is known in the art, are sensors that generate an optical or electrical signal corresponding to the pressure of the water or the time gradient (dp/dt) of pressure in the water. The vessel that tows the one or more streamers typically includes recording equipment to make a record, indexed with respect to time, of the signals generated by the hydrophones in response to the detected acoustic energy. The record of signals is processed, as previously explained, to infer structures of and compositions of the earth formations below the locations at which the seismic survey is performed.

Marine seismic data include an effect that limits the accuracy of inferring the structure and composition of the subsurface rock formations. This effect, known as source ghosting, arises because water has a substantially different density and propagation velocity of pressure waves than the air above the water surface. Source ghosting can be understood as follows. When the air gun or air gun array is actuated, acoustic energy radiates generally outwardly from the air gun or array. Half of the energy travels downwardly where it passes through the water bottom and into the subsurface rock formations. The other half of the acoustic energy travels upwardly from the gun or array and most of this energy reflects from the water surface whereupon it travels downwardly. The reflected acoustic energy will be delayed in time and also be shifted in phase by about 180 degrees from the directly downward propagating acoustic energy. The surface-reflected, downwardly traveling acoustic energy is commonly known as a "ghost" signal. The ghost signal interferes with the directly downward propagating wave-field causing constructive interference in some parts of the frequency band and destructive interference in other parts of the frequency band. This causes a sequence of notches in the spectrum, equally spaced in frequency including a notch at zero frequency (0 Hz). The frequencies of these notches in the detected acoustic signal are related to the depth at which the air gun or gun array is disposed, as is well known in the art. The effect of the source ghosting is typically referred to as the "source ghost."

The seismic energy emitted by the source is attenuated with propagation distance because of geometrical spreading, transmission loss, and absorption. The absorption of higher-frequency energy at a greater rate than lower-frequency energy is well known in the art. Therefore, for deep penetration it is a desire to maximize the energy emitted by the source at lower frequencies. Since the source ghost has a notch at 0 Hz, it is limiting the energy in the low-frequency end. This may be improved by towing the sources at a greater depth. However, this causes the ghost notches in the spectrum to occur at lower frequencies, and hence limits the high frequency parts of the spectrum needed for high resolution imaging of shallower targets. Also, when using air gun(s) as a seismic energy source, the fundamental frequency of the gun(s) increases with increasing depth. Hence, the increase in energy in the low frequency end when towing the air-guns deeper due to the source ghost, is counteracted by the increase in fundamental frequency of the air-gun(s).

A traditional way of increasing the signal level emitted by the source across the bandwidth when using air-gun(s) is to increase the total volume of air released by the air-gun(s) and/or to increase the operating pressure. However, the maximum volume of air that can be released for every shot and the maximum air pressure is limited by the available source equipment and air-supply system. To change this can be very expensive and time consuming. Also, increasing the source strength may have an impact on marine life. Therefore, maximizing the use of the signal emitted by the source may be of great value and reduce the need to increase the energy level emitted by the source. By extracting the upward (ghosted) and the directly downward propagating wave-fields from the source, the effects of the source ghost are eliminated and the signal around all ghost notches is boosted including the notch at 0 Hz. These separated wave-fields can also be time shifted to the sea-surface or a common reference depth using the known source depth(s), then by applying a 180 phase shift to the ghosted signal, they can be summed together constructively. In this way almost all energy emitted by the source is utilized, which consequentially almost doubles the primary energy level for a given energy source.

A technique known in the art for extracting the source ghost is described in M. Egan et al., *Full deghosting of OBC data with over/under source acquisition*, 2007 Annual Meeting, San Antonio, Tex., Society of Exploration Geophysicists. The technique described in the Egan et al. publication includes towing a first seismic energy source at a first depth in the water, and towing a second seismic energy source at a second depth in the water. The sources are air guns or arrays thereof. The second source is also towed at a selected distance behind the first source. The first source is actuated and seismic signals are recorded corresponding to actuations of the first source. After the towing vessel has moved so that the second source is disposed at substantially the same geodetic position as the first source was at the time of its actuation, the second source is actuated and seismic signals are again recorded. A "deghosted" seismic data set is obtained using the technique described more fully in the Egan et al. publication.

One of the main issues with the over/under source technique described in the Egan et al. publication referred to above is that the number of shot positions is half compared to conventional source actuation techniques causing the fold coverage to be half. Another issue with this technique, if the seismic receivers are towed behind a vessel and hence moving from shot to shot, is that the receivers have moved a considerable distance between when the sources at different depths are actuated. To maintain the number of shot positions and fold coverage as in conventional marine seismic acquisition, and to minimize the difference in receiver positions when the sources at different depths are actuated, it is desirable to have a method for extracting the source ghost that allows sources towed at different depths to be actuated during the recording of each shot record.

A technique known in the art for actuating multiple sources during the recording of each shot record is described in U.S. Pat. No. 6,882,938 issued to S. Vaage. In the described technique, multiple sources are actuated with selected variable time delays relative to the start of the seismic recording. The wave-fields emitted by each individual source can be extracted by using the coherency of the signals from one source in certain domains after correcting for the known time delays of actuating that source.

DETAILED DESCRIPTION

Figure 1:
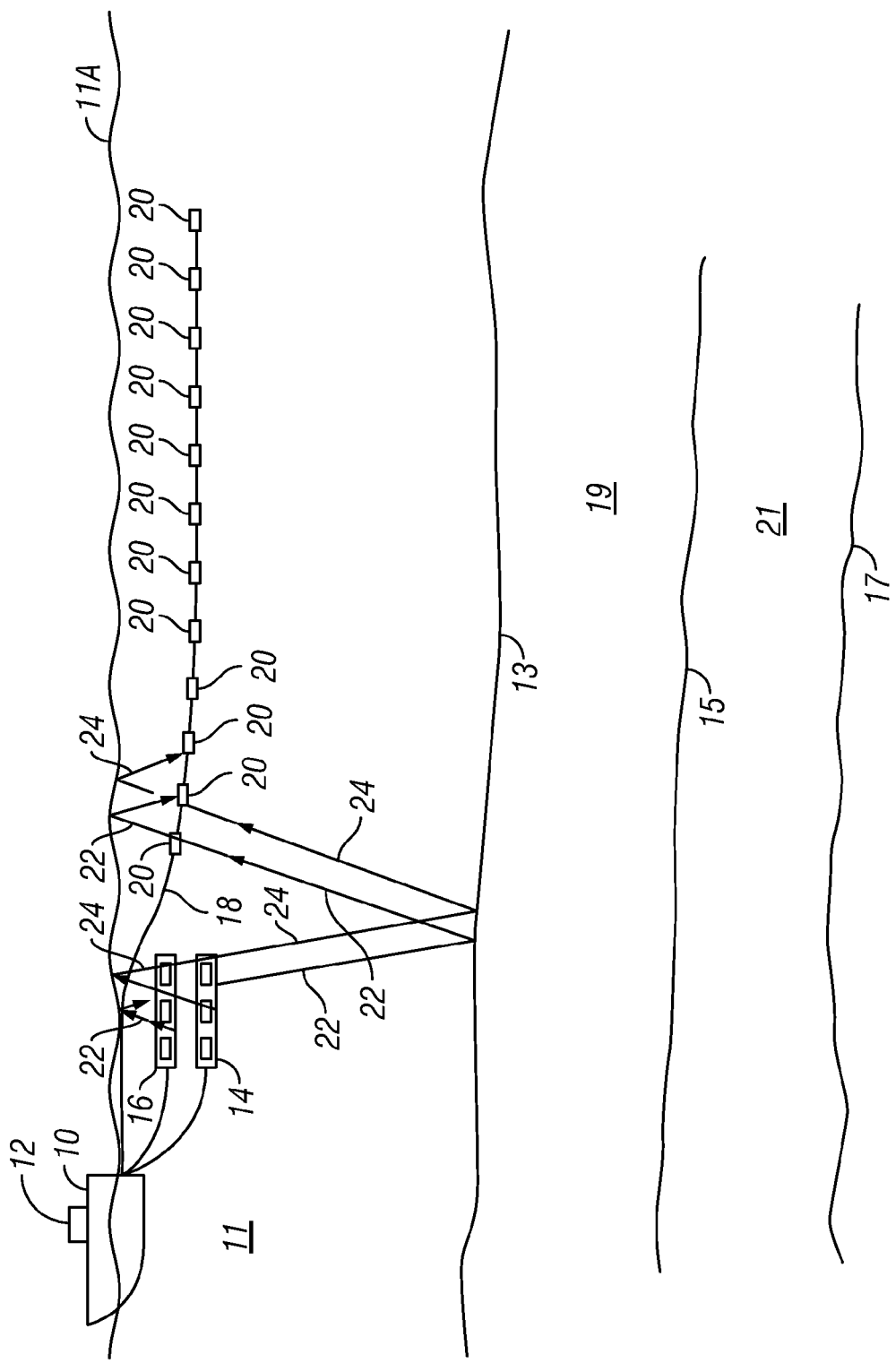
FIG. 1 shows acquiring seismic data in cross section to show an example arrangement of seismic energy sources.

FIG. 1 shows in cross sectional view an example arrangement for acquiring seismic data according to the disclosure. A seismic survey vessel 10 moves along the surface 11A of a body of water 11 such as a lake or the ocean. The vessel 10 typically includes equipment shown generally at 12 and referred to for convenience as a "recording system." The recording system 12 may include devices (none shown separately) for selectively actuating seismic energy sources 14, 16 (explained below), for actuating and recording the signals generated by the sensors or receivers 20 (explained below) in response to seismic energy imparted into the water 11 and thereby into rock formations 19, 21 below the water bottom 13, and for determining geodetic position of the vessel 10, the seismic energy sources 14, 16 and each of a plurality of seismic sensors or receivers 20 at any time.

The vessel 10 is shown towing two seismic energy sources 14, 16. The seismic energy sources 14, 16 can be any type of marine energy source including but not limited to air guns and water guns, or arrays of such energy sources. In the example shown in FIG. 1, the sources 14, 16 are towed at substantially the same distance behind the vessel 10 and at different depths in the water 11. In other examples, the sources 14, 16 may be towed by a different vessel (not shown), or may be in a fixed position (provided that the depths are different as shown in FIG. 1). Therefore, having the survey vessel 10 tow the sources 14, 16 is not a limit on the scope of the present disclosure.

The vessel 10 is also shown towing a seismic streamer 18. However, this disclosure is generally related to the energy source, and therefore may be used together with any type of towed seismic streamer in any configuration, ocean bottom cable, sensors deployed in boreholes etc., and with any type of receiving sensor including but not limited to pressure sensors, pressure time gradient sensors, velocity sensors, accelerometers etc., or any combination thereof.

During operation of the arrangement in FIG. 1, at selected times after a first delay time relative to start of the seismic recording the acquisition system 12 actuates a first one of the seismic energy sources, e.g., source 14. Energy from the first source 14 travels outwardly therefrom as shown at 24. Some of the energy travels downwardly where it is reflected at acoustic impedance boundaries, e.g., the water bottom 13 and at the boundaries 15, 17 between different rock formations 19, 21. Only the water bottom reflections are shown in FIG. 1 for clarity of the illustration. Up-going portions of the energy from the first source 14 are reflected from the water surface 11A as shown in FIG. 1. The recording system 12 is configured to actuate the second seismic energy source, e.g., source 16, at the end of a second selected time delay relative to the start of the seismic data recording, or, alternatively, after a selected time before or after the actuation of the first source 14. Energy travelling outwardly from the second source 16 moves along similar paths as the energy from the first source 14 as shown at 22 in FIG. 1. In the present disclosure, each actuation of both the first and second seismic energy sources with the above described time delays may be referred to as a "firing sequence." The time delays vary from firing sequence to firing sequence in a known, random, semi-random or systematic manner. Typically, the time delays are less than one second, but may also be longer. It is also important for the time delays for the firing of the sources to be different in each firing sequence. The difference in time delay between firing the first source and the second source should also vary in a known manner which may be random, semi-random or systematic.

Figure 2:
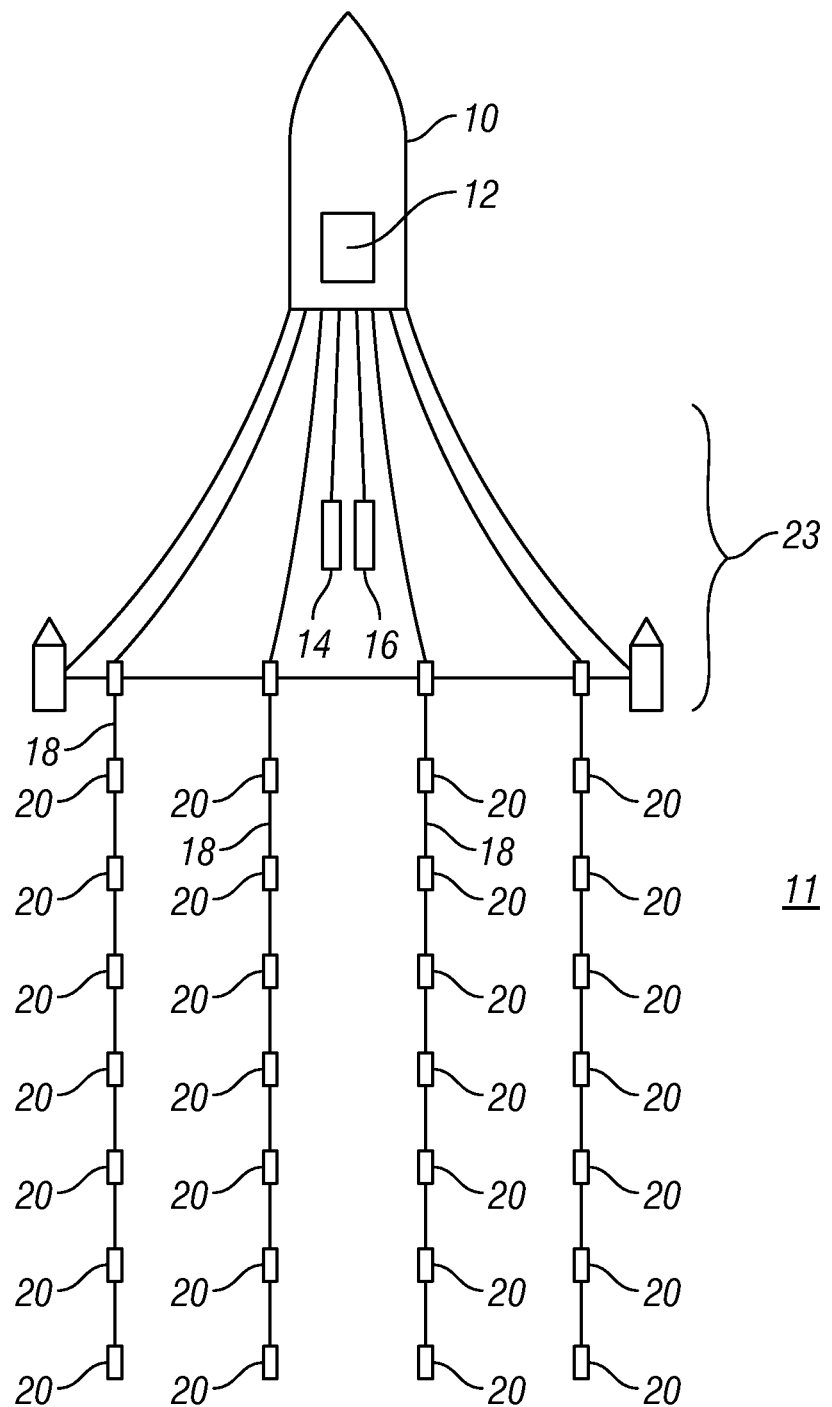
FIG. 2 shows a plan view of acquiring seismic data to show an example arrangement of seismic receiver streamers.

FIG. 2 shows the arrangement of FIG. 1 in plan view to illustrate towing a plurality of laterally spaced apart streamers 18. The streamers 18 can be maintained in their relative lateral and longitudinal positions with respect to the vessel 10 using towing equipment 23 of types well known in the art. What is also shown in FIG. 2 is that the first source 14 and the second source 16 can be laterally displaced (and/or longitudinally displaced in other examples) to avoid, in the case the sources 14, 16 are air guns or arrays thereof, having dispersed air in the water 11 from first source 14 affect the upwardly traveling seismic energy from the second source 16. Lateral and/or longitudinal displacement is contemplated as being only a few meters so that the sources 14, 16 provide energy equivalent to being that which would occur if the sources 14, 16 were in the same vertical plane and at the same longitudinal distance behind the vessel, or expressed differently, at essentially the same geodetic position. By avoiding having dispersed air above the second source 16 when actuated, the effects of the water surface (11A in FIG. 1) will be, adjusted for water depth, substantially the same as the effect thereof on the first source (14 in FIG. 1).

The source actuation and signal recording explained above is repeated for a plurality of firing sequences while the vessel 10, sources 14, 16 and streamers 18 move through the water 11. The signal recordings made for each firing sequence by the recording system 12 may be referred to as a "shot record", and each such shot record will include, for each receiver 20, signals corresponding to the seismic energy produced by both the first source 14 and the second source 16.

Figure 3:
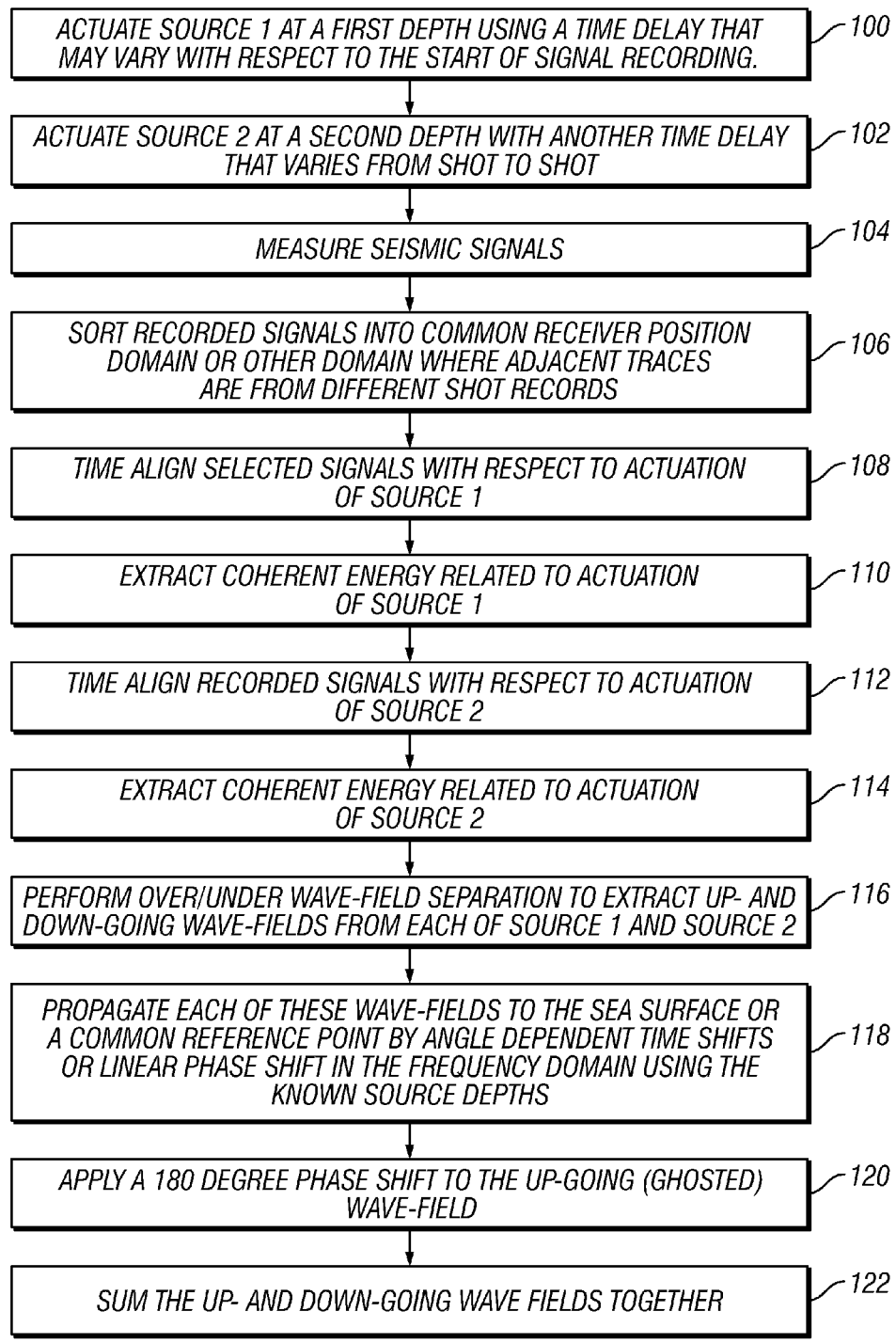
FIG. 3 shows a flow chart of example processes according to the present disclosure.

An example method according to the disclosure will now be explained with reference to the flow chart in FIG. 3. At 100 the first source (14 in FIG. 1) is actuated. Such actuation may be performed using a time delay with respect to the start of seismic signal recording.

At 102, the second source (16 in FIG. 1) may be actuated in a plurality of firing sequences with a different time delay. The time delay between the actuation of the first source and the second source needs to vary from firing sequence to firing sequence, and may be negative such that the actuation of the second source may precede the actuation of the first source. The above firing of the first and second sources using variable time delays with respect to recording time may be repeated for a plurality of firing sequences. For each such firing sequence, the receivers in each streamer measure a signal, as shown at 104 and also as explained above. The recording system (12 in FIG. 1) may make recordings of the signals produced by the receivers in each firing sequence, again as explained above.

At 106, the measured signals may be sorted into common receiver position gathers or some other gather consisting of traces from different shot records. A common receiver position gather is a set of traces selected from the shot records in which for each trace the receiver is located at substantially the same geodetic position at the time of recording of the respective traces. Referring back to FIG. 1, a first firing sequence may generate a signal ("trace") for the receiver 20 nearest the vessel 10, for example. When the vessel 10 has moved so that the next receiver 20 along the streamer 18 is located at substantially the same geodetic position as was the nearest receiver at the time of the first firing sequence, the sources 14, 16 may be actuated as explained above in a second firing sequence. The traces recorded from the second receiver 20 in the second firing sequence will represent a common receiver position record with respect to the traces recorded from the first receiver in the first firing sequence. Because the geodetic positions of the receivers 20 may be determined by the equipment (not shown separately) in the recording system 12 in each firing sequence, sorting the processed traces into common receiver position gathers may include selecting traces in which the geodetic positions of the receiver from which the traces are generated are substantially the same.

Referring once again to FIG. 3, at 108, the received signals may be time aligned to the actuation time of the first source. In some examples, the actuation time of the first source and the start of recording time may be identical and such time alignment may not be used in such examples. Time alignment may be performed, for example, by time shifting each trace in each common receiver position gather by the time delay of the first source in each firing sequence with respect to the start of the signal recording time. The energy from the first source that has been time aligned will then be coherent in the receiver gather, whereas the energy for the second source will be incoherent. At 110, a coherency filter or other technique may be applied to the common receiver position trace gathers after time alignment with respect to firing the first source if required to extract the portion of the recorded signals resulting from the first source (14 in FIG. 1). Techniques for extracting signals from individual sources actuated into the same seismic records with variable time delays are described, for example in P. Akerberg, et al., *Simultaneous source separation by sparse radon transform,* 2008 Annual Meeting, Las Vegas, Nev., Society of Exploration Geophysicists. Another technique is described in, S. Spitz, Simultaneous source separation: a prediction-subtraction approach, 2008 Annual Meeting, Las Vegas, Nev., Society of Exploration Geophysicists.

At 112, the common receiver position gathers may then be time-aligned to the actuation time of the second source (16 in FIG. 1) in each firing sequence. Time alignment may be performed, for example, by time shifting each trace in each common receiver position gather by the time delay in each firing sequence. At 114, coherency filtering, or, for example, the technique described in the Akerberg et al. publication, substantially as explained above with reference to 110 in FIG. 3 may be performed on the second source time aligned common shot record traces.

At 116, the up-going and down-going component signals resulting from the first source and from the second source may be used in a so-called "over/under" processing technique to extract the effect of the source ghost. One example of such a technique is described in, M. Egan et al., *Full deghosting of OBC data with over/under source acquisition,* 2007 Annual Meeting, San Antonio, Tex., Society of Exploration Geophysicists, referenced in the Background section herein. The technique described in the Egan et al. reference is based on a dual streamer technique described in, B. Posthumus, *Deghosting using a twin streamer configuration,* 52nd annual meeting, Copenhagen, Denmark, European Association of Geoscientists and Engineers, 1990. To summarize the method described in the Posthumus publication as applied to the present disclosure, seismic signals originating from the first source are phase and amplitude corrected with respect to seismic signals originating from the second source, and the corrected signals are added as a weighted sum to generate deghosted signals. Techniques for separating up-going and down-going wave-fields with an over/under configuration are described in D. Monk, *Wavefield separation of twin streamer data,* First Break Vol. 8, No. 3, March 1990.

Previous work on the over/under method has focused on application to seismic receivers operated at different depths in a body of water (see the references cited above). The seismic receivers typically have identical responses (amplitude and phase) at all applicable depths. Therefore there is no need to apply response corrections before combining the data sets from the two (or more) depths. The same is not true when the methodology is applied to seismic energy sources, because the wave-field of marine seismic energy sources is substantially sensitive to the hydrostatic pressure, which in turn is a function of source depth. Therefore, in the over/under methodology as applied to seismic energy sources there is an additional correction for the source responses that needs to be applied. Note that such correction would be unnecessary if the individual source responses were specifically designed to be close to identical at a selected reference depth with the sources themselves operating at different depths. There are a variety of known techniques for designing, measuring or calculating the wave-fields of seismic sources, which have different levels of accuracy. The wave-field or selected positions in the wave-field can be measured directly (e.g. far-field measurement) or the wave-field can be calculated based on physical models of the source. There are also various methods of source monitoring, which determine the wave-field of the source array from shot to shot, using various sensors disposed on the seismic source array. These include the so-called *Notional source method*, by Anton Ziolkowski et al. (1982) and, for example, *Method of Seismic Source Monitoring Using Modeled Source Signatures with Calibration Function*, U.S. Pat. No. 7,218,572 issued to Parkes.

A result of the over/under wave-field separation is, at 116, the directly downward propagating energy and the up-going ghosted energy from both sources separated into separate wave-fields.

These separated up-going and down-going wave-fields are, at 118, propagated to the sea-surface or to any selected common reference depth based on known towing depths of the sources. The propagation may be performed using angle dependent time shifting based on known source depths and angle of the received incoming wave-fronts, or by linear phase shifting if the propagation is performed in the frequency domain. Since the sea-surface (water surface) represents a negative reflection coefficient, the up-going (ghosted) wave-field is then 180 degree phase shifted at 120. Finally the up-going and down-going wave-fields may be summed at 122. In this way, most of the energy emitted by the two sources can be used constructively.

Figure 4:
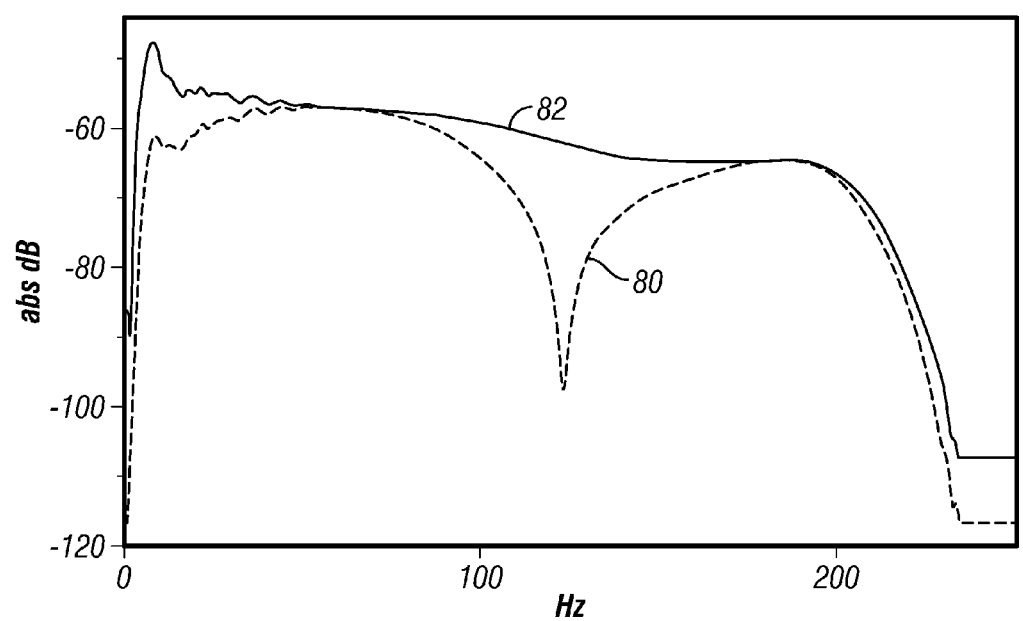
FIG. 4 shows an example of spectral output of a single seismic source with that of combined seismic sources operated according to the present disclosure.

FIG. 4 shows a graph of the energy output with respect to frequency of a air-gun source array, at curve 80 contrasted with a graph at 82 of energy output of a similar source with the same total volume and energy output where one half of the array is operated at one depth, and the other half of the array at a different depth, and the signal processed as explained above.

Methods according to the disclosure may provide improved quality seismic images because of the substantial enhancement of the seismic signal across the frequency band to do constructive summation of the up- and down-going wave-fields from the source(s).

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for marine seismic surveying, comprising:
   separating up-going and down-going wavefields from seismic energy emitted by at least one marine seismic energy source;
   propagating the separated up-going and down-going wavefields from the at least one source to at least one of a water surface and a common reference depth;
   180 degree phase shifting one of the up-going and down-going wavefield;
   summing the propagated, phase shifted up-going and down-going wavefields; and
   generating a data product from the summed, propagated, and phase shifted up-going and down-going wavefields.

2. The method of claim 1 wherein the separated up-going and down-going wave-fields are propagated to at least one of a water surface and a common reference depth using angle dependent time shifts based on known source depths and emission angles.

3. The method of claim 1 wherein the separated up-going and down-going wave-fields are propagated to at least one of a water surface and a common reference depth using angle dependent linear phase shifts in the frequency domain.

4. The method of claim 1 wherein one of the separated up-going and down-going wave-field is 180 degree phase shifted before propagating the wavefields to at least one of a water surface and a common reference depth.

5. The method of claim 1 wherein the up-going and down-going wave-fields are propagated to at least one of a water surface and a common reference depth before 180 degree phase shifting.

6. The method of claim 1 wherein the seismic energy is emitted by at least two sources operated at different depths and at substantially a same geodetic position.

7. The method of claim 1 further comprising:
   deploying at least two marine seismic energy sources at different depths in the body of water and at substantially a same longitudinal position from the seismic vessel;
   actuating each of the seismic energy sources in the plurality of firing sequences, each sequence having a known, different time delay between firing each of the sources and the start of seismic signal recording;
   recording the seismic signals corresponding to each firing sequence;
   determining the seismic energy from the recorded seismic signals corresponding to each firing sequence; and
   generating a data product from the summed, propagated, and phase shifted up-going and down-going wavefields corresponding to each firing sequence.

8. A method for marine seismic surveying, comprising:
   deploying at least two marine seismic energy sources at different depths in a body of water and at substantially a same longitudinal position from a seismic vessel;
   actuating each of the seismic energy sources in a plurality of firing sequences, each firing sequence having a known, different time delay between firing each of the sources and the start of seismic signal recording;
   recording seismic signals corresponding to each firing sequence;
   determining seismic energy from the recorded seismic signals corresponding to each firing sequence; and
   separating up-going and down-going wavefields from the determined seismic energy;
   propagating the separated up-going and down-going wavefields to at least one of a water surface and a common reference depth;
   180 degree phase shifting one of the up-going and down-going wavefield; and
   summing the propagated, phase shifted up-going and down-going wavefields.

9. The method of claim 8 wherein the separated up-going and down-going wave-fields are propagated to the at least one of a water surface and the common reference depth using angle dependent time shifts based on known source depths and emission angles.

10. The method of claim 8 wherein the separated up-going and down-going wave-fields are propagated to at least one of a water surface and a common reference depth using angle dependent linear phase shifts in the frequency domain.

11. The method of claim 8 wherein one of the separated up-going and down-going wave-field is 180 degree phase shifted before propagating the wavefields to the at least one of a water surface and the common reference depth.

12. The method of claim 8 wherein the up-going and down-going wave-fields are propagated to at least one of a water surface and a common reference depth before 180 degree phase shifting.

13. The method of claim 8 further comprising generating a data product from the summed, propagated, and phase shifted up-going and down-going wavefields.

* * * * *